US012444517B2

(12) United States Patent
Chavez et al.

(10) Patent No.: US 12,444,517 B2
(45) Date of Patent: Oct. 14, 2025

(54) MAGNETO-OPTICAL TRAP SYSTEM

(71) Applicant: NORTHROP GRUMMAN SYSTEMS CORPORATION, Falls Church, VA (US)

(72) Inventors: Dora Chavez, Canoga Park, CA (US); Eric A. Imhof, Albuquerque, NM (US); Michael S. Larsen, Woodland Hills, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 615 days.

(21) Appl. No.: 17/945,775

(22) Filed: Sep. 15, 2022

(65) Prior Publication Data

US 2024/0096513 A1    Mar. 21, 2024

(51) Int. Cl.
*G21K 1/00* (2006.01)
(52) U.S. Cl.
CPC .................................... *G21K 1/006* (2013.01)
(58) Field of Classification Search
CPC .......................................................... G21K 1/006
See application file for complete search history.

(56) References Cited

U.S. PATENT DOCUMENTS

| | | |
|---|---|---|
| 8,405,021 B2 | 3/2013 | Anderson et al. |
| 8,530,853 B2 | 9/2013 | Steele et al. |
| 8,835,833 B2 | 9/2014 | Du et al. |
| 9,134,450 B2 | 9/2015 | Desruelle et al. |
| 9,270,385 B2 | 2/2016 | Meyers et al. |
| 9,291,508 B1 | 3/2016 | Biedermann et al. |
| 10,157,692 B2 | 12/2018 | Gill et al. |
| 10,371,763 B2 | 8/2019 | Salit |

(Continued)

FOREIGN PATENT DOCUMENTS

| | | |
|---|---|---|
| EP | 3239722 B1 | 9/2018 |
| JP | 2020-020636 A | 2/2020 |

(Continued)

OTHER PUBLICATIONS

ISR (International Search Report) for corresponding PCT/US2023/030357, mailed Dec. 8, 2023.

(Continued)

*Primary Examiner* — Sean M Luck
(74) *Attorney, Agent, or Firm* — Tarolli, Sundheim, Covell &Tummino LLP

(57) ABSTRACT

One example includes a MOT system. The system includes first optical source configured to provide a plurality of first optical beams parallel to a central axis associated with the MOT system, and a first set of optics configured to focus the first optical beams to the central axis through a trapping region comprising a vapor of atoms. The system also includes a second optical source configured to provide a plurality of second optical beams parallel to the central axis associated with the MOT system, and a second set of optics configured to focus the second optical beams to the central axis through the trapping region. Each of the second optical beams can be coaxial with a respective one of the first optical beams, such that each of the first optical beams is counterpropagating with a respective one of the second optical beams.

20 Claims, 4 Drawing Sheets

(56) References Cited

U.S. PATENT DOCUMENTS

| | | |
|---|---|---|
| 2013/0048846 A1 | 2/2013 | Du et al. |
| 2020/0185120 A1 | 6/2020 | Keesling Contreras et al. |
| 2021/0319925 A1* | 10/2021 | Cheiney ................ G01P 15/093 |

FOREIGN PATENT DOCUMENTS

| | | |
|---|---|---|
| WO | 2019-032159 A2 | 2/2019 |
| WO | 2019/040817 A2 | 2/2019 |
| WO | 2019/092412 A1 | 5/2019 |
| WO | 2019-116047 A1 | 6/2019 |

OTHER PUBLICATIONS

Vangeleyn, et al.: Single-laser, one beam, tetrahedral magneto-optical trap; 2009 Optical Society of America; OCIS codes: (020.1335) Atom optics; (140.3320) Laser cooling.

* cited by examiner

MAGNETO-OPTICAL TRAP SYSTEM

TECHNICAL FIELD

This disclosure relates generally to optical systems, and more specifically to a magneto-optical trap (MOT) system.

BACKGROUND

Atom trapping can be utilized in various systems which require extremely accurate and stable frequencies, such as sensors, atomic clocks, and/or interferometers. As an example, atomic clocks can be used in bistatic radar systems, global positioning systems (GPS), and other navigation and positioning systems, such as satellite systems. Atomic clocks can also be used in communications systems, such as cellular phone systems. Similarly, sensors based on atom trapping can be very accurate based on the optical response of energy transitions of the atoms. Some atom trapping systems can include a magneto-optical trap (MOT). A MOT functions by trapping atoms, such as Cesium (Cs) or Rubidium (Rb), in an atom trapping region. A variety of types of optical systems, such as implementing optical signals, can interact with the vapor of atoms in the trapping region. Accordingly, a variety of sensors and interferometers can implement a MOT to provide accurate determination of any of a variety of measurable parameters.

SUMMARY

One example includes a MOT system. The system includes first optical source configured to provide a plurality of first optical beams parallel to a central axis associated with the MOT system, and a first set of optics configured to focus the first optical beams to the central axis through a trapping region comprising a vapor of atoms. The system also includes a second optical source configured to provide a plurality of second optical beams parallel to the central axis associated with the MOT system, and a second set of optics configured to focus the second optical beams to the central axis through the trapping region. Each of the second optical beams can be coaxial with a respective one of the first optical beams, such that each of the first optical beams is counterpropagating with a respective one of the second optical beams.

Another example includes a method for trapping a vapor of atoms in a trapping region in a MOT system. The method includes providing a first optical beam along a central axis associated with the MOT system via a trapping laser and splitting the first optical beam into a plurality of first optical beams parallel to the central axis via a first set of optics. The method also includes providing the plurality of first optical beams to the central axis through the trapping region. The method also includes reflecting the plurality of first optical beams via a second set of optics to provide a plurality of second optical beams parallel to the central axis, and providing the second optical beams to the central axis through the trapping region via the second set of optics. Each of the second optical beams can be coaxial with a respective one of the first optical beams, such that each of the first optical beams is counterpropagating with a respective one of the second optical beams.

Another example includes an optical system. The optical system includes a magneto-optical trap (MOT) system. The MOT system includes a first optical source configured to provide at least one first optical beam parallel to a central axis associated with the MOT system and a first set of optics configured to provide the at least one first optical beam as a plurality of first optical beams to a central axis through a trapping region comprising a vapor of atoms. The MOT system also includes a second optical source configured to provide at least one second optical beam parallel to the central axis, and a second set of optics configured to provide the at least one second optical beam as a plurality of second optical beams through the trapping region. Each of the second optical beams can be coaxial with a respective one of the first optical beams, such that each of the first optical beams is counterpropagating with a respective one of the second optical beams. The system further includes a photodetector system configured to receive detection light associated with the vapor of atoms, and a processor configured to determine a measurable parameter based on a characteristic associated with the detection light.

DETAILED DESCRIPTION

Figure 1:
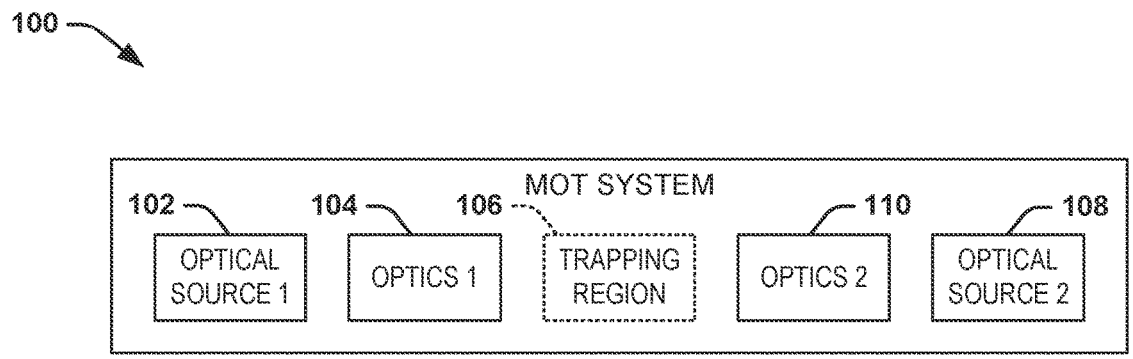
FIG. 1 illustrates an example block diagram of a magneto-optical trap (MOT) system.

This disclosure relates generally to optical systems, and more specifically to a magneto-optical trap (MOT) system. The MOT system can be implemented in any of a variety of optical systems that implements atom trapping, such as sensors, atomic clocks, and/or interferometers. The MOT system includes a first optical source that provides at least one first optical beam parallel to a central axis and a first set of optics. As an example, the first optical beam can be provided along the central axis. The first optical source can be implemented as at least one trapping laser, and the first set of optics can include at least one optical splitter and/or at least one lens. As an example, the first optical source can include a single trapping laser that provides the first optical beam as a single optical beam along the central axis, with the single optical beam being split into three first optical beams by the first set of optics (e.g., via a set of beamsplitters). The first set of optics is also configured to provide the at least one first optical beam as a plurality of optical beams (e.g., the three first optical beams) to the central axis through a trapping region that includes a vapor of atoms.

The MOT system includes a second optical source that provides at least one second optical beam parallel to the central axis and a second set of optics. The second optical source can be implemented as at least one mirror, such that the at least one second optical beam corresponds to reflected versions of the respective at least one first optical beam provided parallel to the central axis, and the second set of optics can include at least one lens. As an example, the first optical beams exiting the trapping region in divergent directions can be collimated via the at least one lens associated with the second set of optics and can be provided in parallel propagation along the axis away from the trapping region. The first optical beams can be reflected by the mirror, such that the reflected first optical beams can be provided back toward the trapping region as the second optical beams, and can thus be refracted to converge through the trapping region via the at least one lens. The first optical beams and the second optical beams can therefore be provided through the trapping region as counter-propagating pairs of optical beams to facilitate atom-trapping of the vapor of atoms The at least one lens of the second set of optics can also be configured to collimate detection light that is associated with the vapor of atoms, such as resulting from an interrogation of the atoms (e.g., via fluorescence). Therefore, the collimated detection light can be provided along the axis away from the trapping region to be provided to a photodetection system for detection by an associated optical system. As a result, the MOT system can be implemented to provide a compact form-factor optical system (e.g., sensor, interferometer, etc.) with simplified optics for trapping the vapor of atoms.

FIG. 1 illustrates an example block diagram of a magneto-optical trap (MOT) system 100. The MOT system 100 can be implemented in any of a variety of optical systems, such as an optical sensor, interferometer, or atomic clock that implements atom-trapping in a MOT.

The MOT system 100 includes a first optical source ("OPTICAL SOURCE 1") 102 that is configured to generate at least one first optical beam parallel to a central axis of the MOT system 100. As an example, the first optical source 102 can be implemented as at least one trapping laser (e.g., a single trapping laser) that is provided along the central axis. The MOT system 100 also includes a first set of optics ("OPTICS 1") 104 that can include at least one lens. As an example, the first set of optics 104 can include a beamsplitter that is configured to split the at least one first optical beam into a plurality of optical beams (e.g., can split a single first optical beam into a set of three first optical beams), and can refract the first optical beams to the central axis through a trapping region 106 via the at least one lens. As described herein, the trapping region 106 can correspond to a volume of three-dimensional space in which a vapor of atoms (e.g., alkali metal atoms) are optically and/or magnetically confined. As described herein, the central axis extends through the MOT system 100 through a center of the trapping region 106.

The first optical beams can thus be provided by the first set of optics 104 through the trapping region 106 to converge on the central axis in the trapping region 106. Therefore, the first optical beams have propagation trajectories at approximately equal angles to converge with respect to each other on the central axis on an approximate central point of the trapping region 106. For example, the first optical beams can be provided as a set of three first optical beams that are equiangular about and converge to the central axis.

The MOT system 100 also includes a second optical source 108 that is configured to provide at least one second optical beam. As an example, the second optical source 108 can be implemented as at least one mirror, such that the at least one second optical beam corresponds to a reflected version of the respective at least one first optical beam. The MOT system 100 also includes a second set of optics 110 which can include at least one lens. As an example, the first optical beams exiting the trapping region 106 in divergent directions can be collimated via the lens(es) of the second set of optics 110 and can be provided in parallel propagation along the axis away from the trapping region 106.

The second set of optics 110 can also include at least one mirror, such that the first optical beams can be reflected by the mirror(s) of the second set of optics 110 back toward the trapping region 106 as the second optical beams. Thus, the lens(es) of the second set of optics 110 can refract the second optical beams to converge back through the trapping region 106 at the approximate equal angles along the axis through the trapping region 106. The first optical beams and the second optical beams can therefore be provided through the trapping region 106 as counter-propagating pairs of optical beams to facilitate atom-trapping of the vapor of atoms.

The lens(es) associated with the second set of optics 110 can also be configured to collimate detection light that is associated with the vapor of atoms in the trapping region 106. For example, in response to an optical excitation of the vapor of atoms, the vapor of atoms can decay to emit photons (e.g., via fluorescence). Therefore, the collimated detection light can be provided along the axis away from the trapping region for detection of a measurable parameter. For example, the MOT system 100 can be included in an optical system that includes a photodetection system for measurement of a characteristic (e.g., intensity, polarization, frequency, etc.) of the detection light. Therefore, an associated processor of the optical system can measure a measurable parameter (e.g., time, an inertial parameter, etc.) based on the measurement of the parameter of the detection light via the photodetection system. Because the MOT system 100 can be implemented in an axial arrangement to provide the atom-trapping, as opposed to implementing atom-trapping based on orthogonal arrangements of counter-propagating beams as provided in a typical MOT system, the MOT system 100 can be provided in a more compact form-factor optical system (e.g., sensor, interferometer, etc.) with more simplified optics than a typical MOT system for trapping the vapor of atoms.

Figure 2:
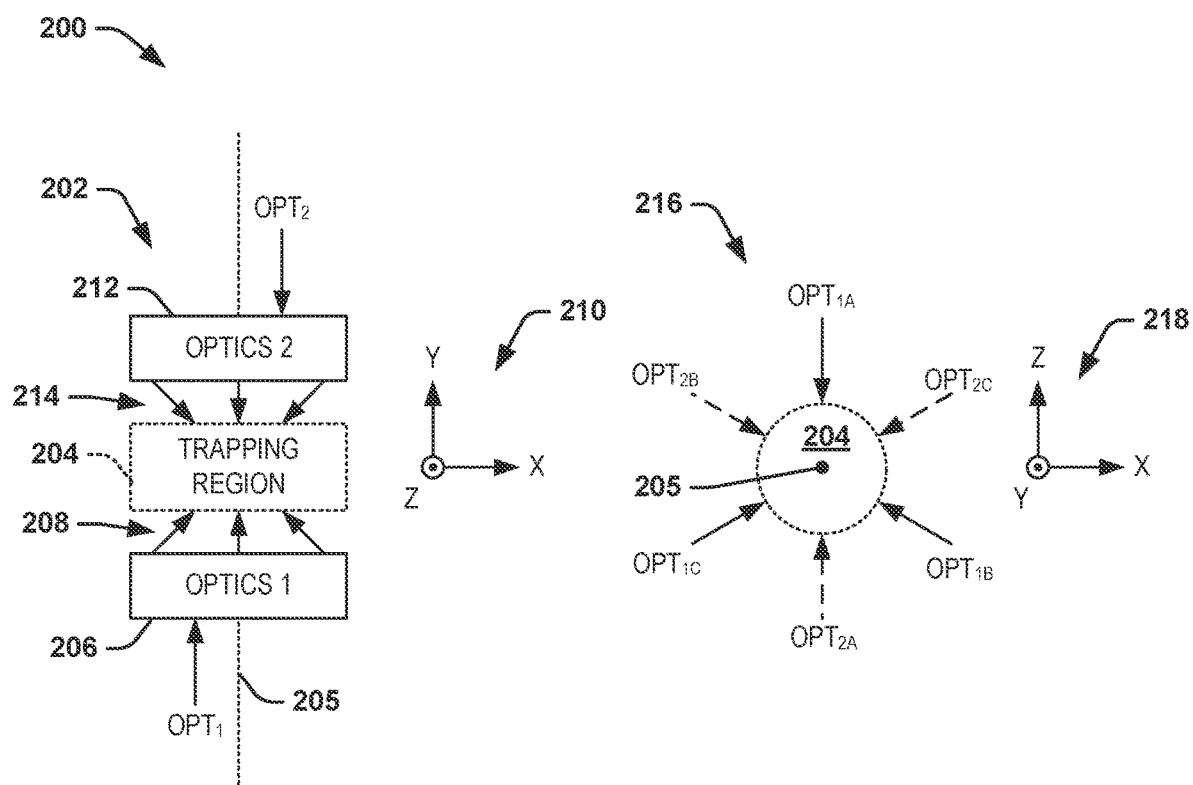
FIG. 2 illustrates an example diagram of a magneto-optical trap (MOT) system.

FIG. 2 illustrates an example diagram 200 of a magneto-optical trap (MOT) system 202. The MOT system 202 can correspond to the MOT system 100 in the example of FIG. 1. Therefore, reference is to be made to the example of FIG. 1 in the following description of the example of FIG. 2.

The MOT system 202 is demonstrated in the example of FIG. 2 in an abbreviated manner to demonstrate the optical beams through an associated trapping region 204. The diagram 200 demonstrates at least one first optical beam OPT1 provided parallel to a central axis 205 to a first set of optics 206 ("OPTICS 1"). As an example, the first optical beam(s) OPT1 can be generated from a first optical source (e.g., the first optical source 102) that is configured to generate the at least one first optical beam OPT1 along the central axis 205. For example, the first optical beam(s) OPT1 can be a single optical beam that is split by the first set of optics 206 into multiple optical beams, demonstrated in the example of FIG. 2 as three first optical beams, demonstrated generally at 208. The first set of optics 206 thus refracts the three first optical beams 208 (e.g., via at least one lens) to converge in an approximately central point in the trapping region 204 on the central axis 205. Thus, each of the three first optical beams 208 has an approximately equal vector component that extends along the Y-axis, as provided by the Cartesian coordinate system at 210.

Similarly, the diagram 200 demonstrates at least one second optical beam OPT2 provided parallel to the central axis 205 to a second set of optics 212 ("OPTICS 2"). As an example, the second optical beam(s) OPT2 can be generated from a second optical source (e.g., the second optical source 108) that is configured to generate the at least one second optical beam OPT2. For example, the second optical beam(s) OPT2 can correspond to reflected versions of the three first optical beams 208, such that the second optical beam(s) OPT2 can correspond to three second optical beams OPT2. The second set of optics 212 thus refracts the three second optical beams, demonstrated generally at 214 (e.g., via at least one lens) to converge in an approximately central point in the trapping region 204 that is on the central axis 205. Similar to the three first optical beams 208, each of the three second optical beams 214 has an approximately equal vector component that extends along the −Y-axis, as provided by the Cartesian coordinate system at 210.

The three first optical beams 208 and the three second optical beams 214 can be provided through the trapping region as counter-propagating beams, such that each one of first optical beams 208 is collinear with a respective one of the second optical beams 214. The diagram 200 demonstrates an orthogonal view 216 of the trapping region 204 and the associated optical beams. The orthogonal view 216 thus demonstrates the trapping region 204 and the optical beams 208 and 214 along the Y-axis, based on a 90°-rotated Cartesian coordinate system 218. The optical beams are demonstrated as the three first optical beams 208 (solid lines), labeled $OPT_{1A}$, $OPT_{1B}$, and $OPT_{1C}$, and as the three second optical beams 214 (dashed lines), labeled $OPT_{2A}$, $OPT_{2B}$, and $OPT_{2C}$.

The first optical beam $OPT_{1A}$ is demonstrated as counter-propagating with the respective second optical beam $OPT_{2A}$. The first optical beam $OPT_{1B}$ is demonstrated as counter-propagating with the respective second optical beam $OPT_{2B}$. The first optical beam $OPT_{1C}$ is demonstrated as counter-propagating with the respective second optical beam $OPT_{2C}$. Therefore, in the example of FIG. 2, the set of three first optical beams $OPT_{1A}$, $OPT_{1B}$, and $OPT_{1C}$ and the set of three second optical beams $OPT_{2A}$, $OPT_{2B}$, and $OPT_{2C}$ that are equiangular about and converge to the central axis 205, and thus share a vertex corresponding to a convergence point in an approximate three-dimensional center of the trapping region 204 on the central axis 205.

Figure 3:
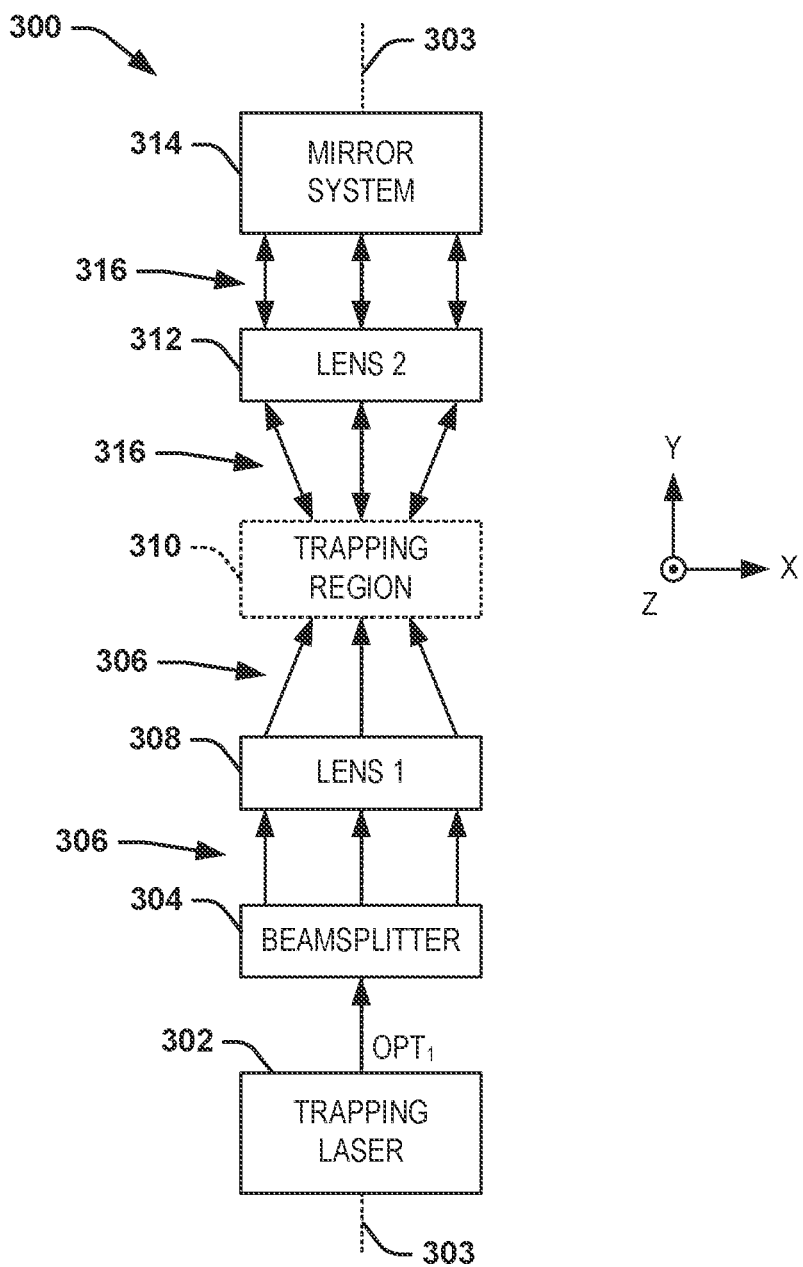
FIG. 3 illustrates another example block diagram of a magneto-optical trap (MOT) system.

FIG. 3 illustrates another example block diagram of a MOT system 300. The MOT system 300 can correspond to the MOT systems 100 and 202 in the respective examples of FIGS. 1 and 2. Therefore, reference is to be made to the examples of FIGS. 1 and 2 in the following description of the example of FIG. 3.

The MOT system 100 includes a trapping laser 302 that is configured to generate a first optical beam $OPT_1$ along a central axis 303. The MOT system 300 also includes a beamsplitter 304 that is configured to split the first optical beam $OPT_1$ into a plurality of first optical beams (e.g., three first optical beams), demonstrated at 306, that are parallel to the central axis 303. In the example of FIG. 3, the first optical beams 306 are demonstrated as collimated by the beamsplitter 304, such that the beamsplitter 304 can include a lens or other optics configured to provide the first optical beams 306 as collimated beams parallel to the central axis 303.

The MOT system 300 also includes a first lens ("LENS 1") 308 that is configured to refract the collimated first optical beams 306 through a trapping region 310. The first optical beams 306 can thus be provided by the first lens 308 through the trapping region 310 such that each of the first optical beams 306 has an approximately equal vector component along the central axis 303 extending through the trapping region 310, demonstrated as the Y-axis in the example of FIG. 3. Thus, the first optical beams 306 can have propagation trajectories at approximately equal angles about the central axis 303 to converge with respect to each other to the central axis 303 on an approximate central point of the trapping region 310.

In the example of FIG. 3, the first optical beams 306 can thus exit the trapping region 310 in divergent trajectories with respect to each other, having passed through the convergence point in the trapping region 310. The MOT system 300 also includes a second lens ("LENS 2") 312 that is configured to collimate the first optical beams 306 parallel to the central axis 303 (e.g., the Y-axis in the example of FIG. 3). Thus, the collimated first optical beams 306 can be provided to a mirror system 314 that includes at least one mirror. The mirror system 314 can thus reflect to the first optical beams 306 back to the second lens 312 as respective second optical beams that are counter-propagating with respect to the first optical beams 306. In the example of FIG. 3, the counter-propagating sets of first and second optical beams is demonstrated by bidirectional arrows at 316.

The second optical beams can thus be provided back to the second lens 312 to be refracted through the trapping region 310 as counter-propagating with respect to the first optical beams 306. Therefore, similar to the first optical beams 306 provided by the first lens 308, each of the second optical beams has an approximately equal vector component along the central axis 303 in the −Y-axis through the trapping region 310. Thus, the second optical beams can have propagation trajectories at approximately equal angles to converge with respect to each other to the central axis 303 on an approximate central point of the trapping region 310. Similar to as described above in the example of FIG. 2, for an example of a quantity of three first and second optical beams, each of the first optical beams 306 and the corresponding second optical beams can have propagation axes that are equiangular about and converge to the central axis 303, and thus share a vertex corresponding to a convergence point in an approximate three-dimensional center of the trapping region 310 on the central axis 303. Accordingly, the MOT system 300 is demonstrated as having an axial arrangement along the Y-axis to achieve optical trapping of a vapor of atoms in the trapping region 310 without implementing the bulky optics required to provide three orthogonal axes of trapping light through a trapping region, as is implemented in a typical MOT system.

Figure 4:
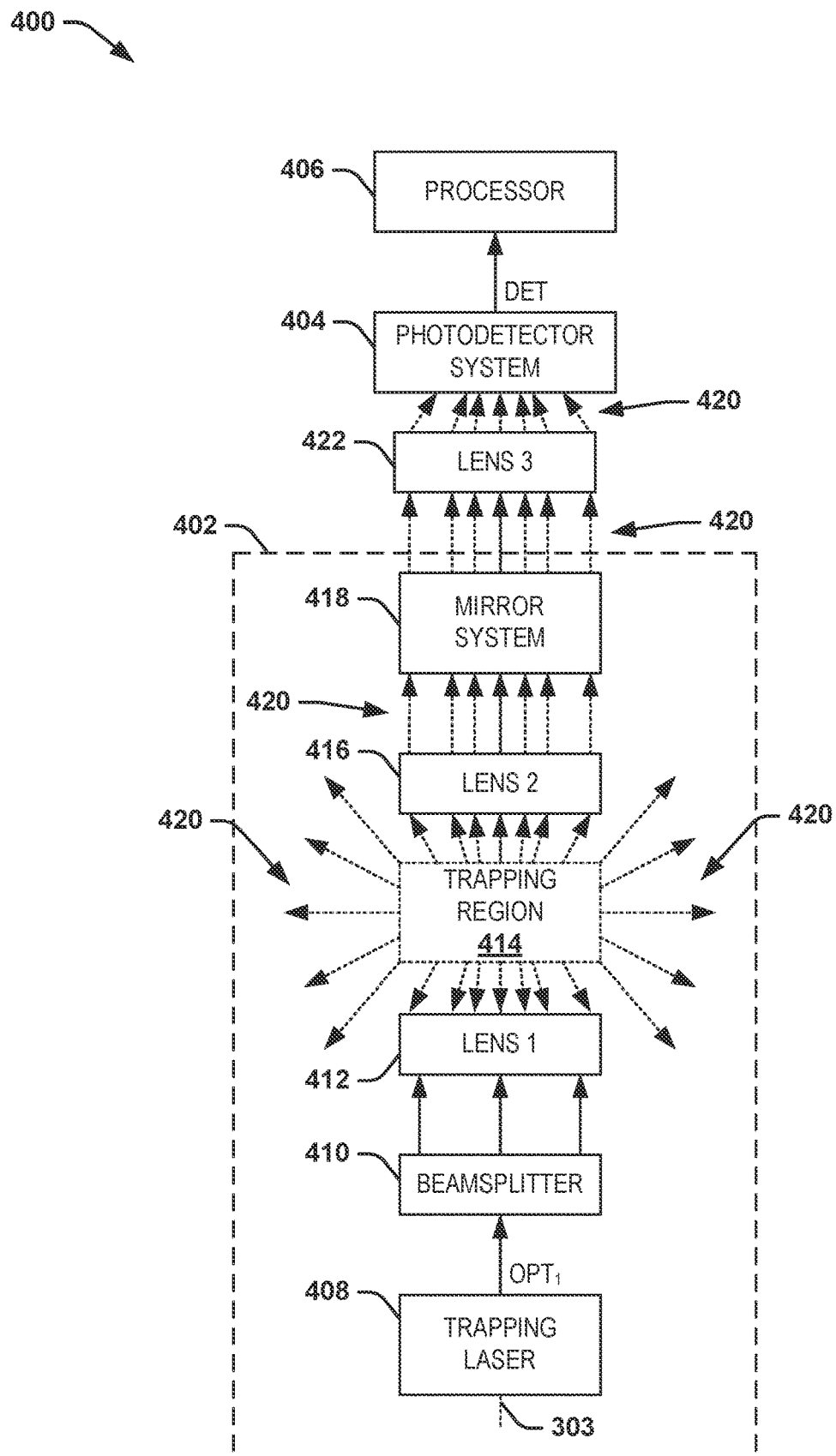
FIG. 4 illustrates an example block diagram of an optical system.

FIG. 4 illustrates an example block diagram of an optical system 400. The optical system 400 can correspond to any of a variety of optical systems that implement atom-trapping, such as an inertial sensor, an atomic clock, and/or an interferometer. The optical system 400 can implement the MOT system 100, 202, or 300 described above in the respective examples of FIGS. 1-3. Therefore, reference is to be made to the examples of FIGS. 1-3 in the following description of the example of FIG. 4.

The optical system 400 includes a MOT system 402, a photodetector system 404, and a processor 406. The MOT system 402 is configured substantially the same as the MOT system 300 in the example of FIG. 3. Thus, the MOT system 402 includes a trapping laser 408, a beamsplitter 410, and a first lens 412. The trapping laser 408 generates a first optical beam $OPT_1$ along a central axis 413 that is split into a plurality of collimated first optical beams parallel to the central axis 413 by the beamsplitter 410, and the first lens 412 refracts the first optical beams to the central axis 413 through a trapping region 414. Similar to as described above, the first optical beams each have an approximately equal vector component along the central axis 413 (e.g., the Y-axis) through the trapping region 414. The MOT system 402 also includes a second lens 416 and a mirror system 418. The second lens 416 collimates the first optical beams leaving the trapping region 414 in parallel propagation (e.g., parallel to the central axis 413) to be reflected by the mirror system 418 as second optical beams back to the second lens 416. The second lens 416 therefore refracts the second optical beams to the central axis 413 through the trapping region 414 as counter-propagating with respect to the first optical beams, as described herein, to provide atom-trapping of the vapor of atoms in the trapping region 414. The counter-propagating first and second optical beams are not demonstrated in the example of FIG. 4 between the trapping region 414 and the mirror system 418.

In the example of FIG. 4, the vapor of atoms in the trapping region 414 can be caused to emit detection light via fluorescence. For example, the vapor of atoms can be excited by interrogation light (e.g., from an interrogation laser, not shown in the example of FIG. 4). Thereafter, the excited atoms can decay to emit photons as fluorescence corresponding to detection light. In the example of FIG. 4, the detection light is demonstrated generally at 420 as dotted lines that are emitted in substantially all directions from the trapping region 414, thus corresponding to the emission of the photons. The detection light 420 can thus have at least one characteristic (e.g., at least one of intensity, polarization, frequency, etc.) that is indicative of a condition of the vapor of atoms, and which can be measurable to determine a measurable parameter associated with the function of the optical system 400 (e.g., time, acceleration, rotation, magnetic field, electric field, etc.).

In the example of FIG. 4, a portion of the detection light 420 that is incident on the second lens 416 is collimated to provide parallel propagation of the detection light 420 parallel to the central the axis 413 (e.g., Y-axis) away from the trapping region 414. The mirror system 418 can be configured (e.g., positionally) to reflect the first optical beams, but to allow at least a portion of the collimated detection light 420 to pass through the mirror system 418. Thus, the collimated detection light 420 can exit the MOT system 402 and be provided to a third lens 422. The third lens 422 can provide (e.g., focus) the detection light 420 onto the photodetector system 404. Thus, the photodetector system 404 can monitor the characteristic (e.g., intensity, polarization, frequency, etc.) of the detection light 420 and provide an electric detection signal DET to the processor 406. The processor 406 can thus determine the measurable parameter associated with the optical system 400 based on the detection signal DET.

Accordingly, based on the axial arrangement of the MOT system 402, the vapor of atoms in the trapping region 414 can be trapped in a manner that does not require three orthogonal axes of optical trapping. Furthermore, the detection light emitted from the vapor of atoms can likewise be provided along the axis of the MOT system 402 for detection. As a result, based on the propagation of the optical beams and the detection light along and parallel to the central axis 413, the optical system 400 can be implemented in a narrow axial form-factor. Accordingly, the optical system 400 can be provided in a compact package for space-savings in any of a variety of environments (e.g., aerospace applications).

Figure 5:
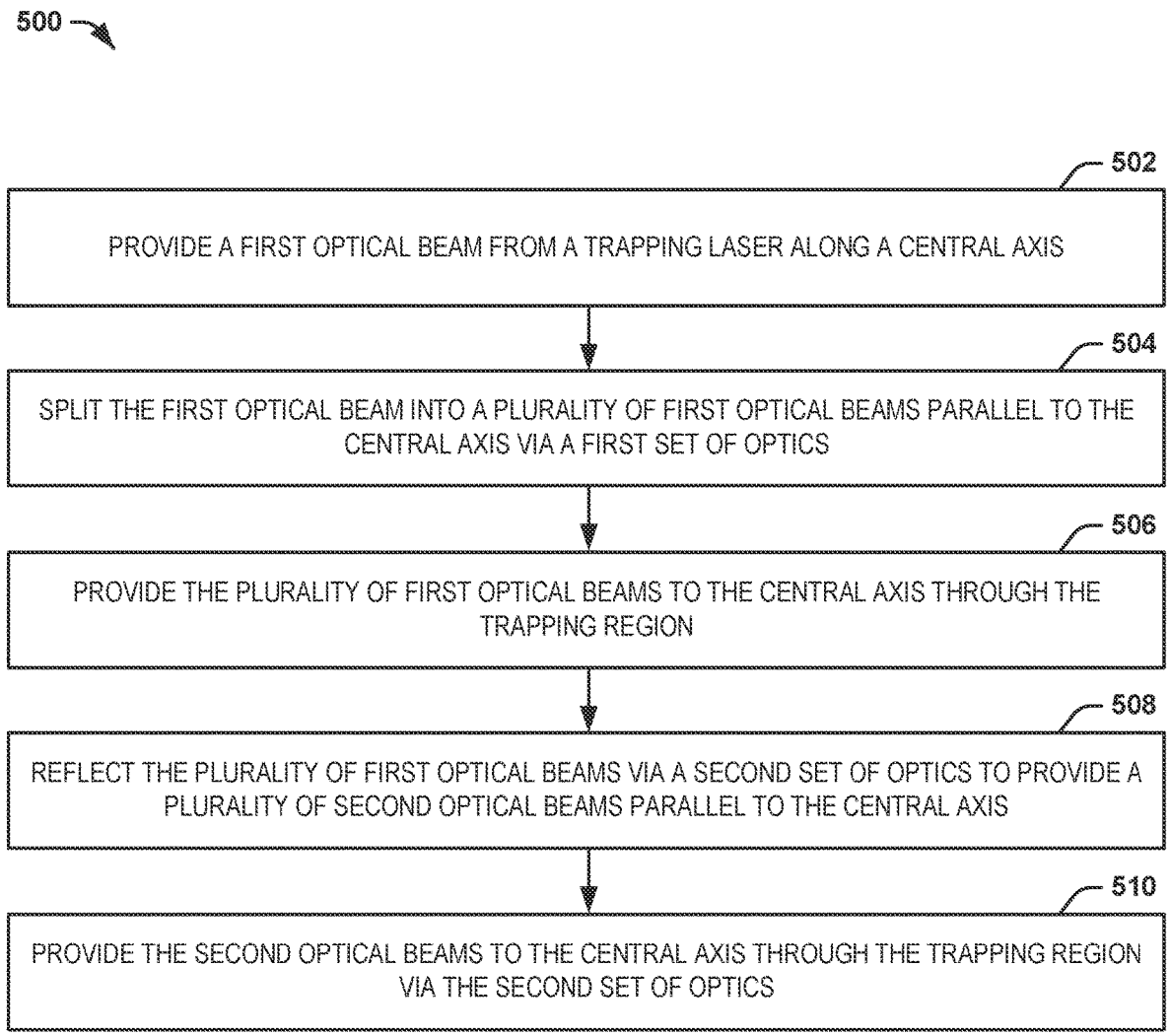
FIG. 5 illustrates an example of a method for trapping atoms.

In view of the foregoing structural and functional features described above, methods in accordance with various aspects of the present disclosure will be better appreciated with reference to FIG. 5. While, for purposes of simplicity of explanation, the method of FIG. 5 is shown and described as executing serially, it is to be understood and appreciated that the present disclosure is not limited by the illustrated orders, as some aspects could, in accordance with the present disclosure, occur in different orders and/or concurrently with other aspects from that shown and described herein. Moreover, not all illustrated features may be required to implement method in accordance with an aspect of the present disclosure.

FIG. 5 illustrates an example of a method 500 for trapping a vapor of atoms in a trapping region (e.g., the trapping region 106) in a magneto optical trap (MOT) system (e.g., the MOT system 100). At 502, a first optical beam (e.g., the first optical beam $OPT_1$) is provided from a trapping laser (e.g., the trapping laser 302) along a central axis (e.g., the central axis 303). At 504, the first optical beam is split into a plurality of first optical beams (e.g., the first optical beams 306) parallel to the central axis via a first set of optics (e.g., the first set of optics 104). At 506, the plurality of first optical beams is provided to the central axis through the trapping region. Each of the first optical beams can have an approximately equal vector component along the central axis (e.g., the Y-axis) extending through the trapping region. At 508, the plurality of first optical beams is reflected via a second set of optics (e.g., the second set of optics 110) to provide a plurality of second optical beams (e.g., the second optical beams $OPT_{2A}$, $OPT_{2B}$, $OPT_{2C}$) parallel to the central axis. At 510, the second optical beams are provided to the central axis through the trapping region via the second set of optics. Each of the second optical beams can be coaxial with a respective one of the first optical beams, such that each of the first optical beams is counterpropagating with a respective one of the second optical beams.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A magneto-optical trap (MOT) system comprising:
    a first optical source configured to provide a plurality of first optical beams parallel to a central axis associated with the MOT system;
    a first set of optics configured to focus the first optical beams to the central axis through a trapping region comprising a vapor of atoms;
    a second optical source configured to provide a plurality of second optical beams parallel to the central axis associated with the MOT system; and
    a second set of optics configured to focus the second optical beams to the central axis through the trapping region, each of the second optical beams being coaxial with a respective one of the first optical beams, such that each of the first optical beams is counterpropagating with a respective one of the second optical beams.

2. The system of claim 1, wherein the first optical beams are arranged as a set of three first optical beams that have propagation axes that are equiangular about the central axis, wherein the propagation axes of the three first optical beams converge in an approximate central point of the trapping region on the central axis, wherein the second optical beams are arranged as a set of three second optical beams that have propagation axes that are equiangular about the central axis, wherein the propagation axes of the three second optical beams converge in the approximate central point of the trapping region on the central axis.

3. The system of claim 1, wherein the first optical source comprises:
    a trapping laser configured to generate a single optical beam along the central axis; and
    a beamsplitter configured to split the single first optical beam into the plurality of first optical beams.

4. The system of claim 1, wherein the second optical source comprises a set of mirrors to provide a plurality of the second optical beams as reflected versions of the respective plurality of the first optical beams.

5. The system of claim 1, wherein the first set of optics comprises a lens configured to refract the plurality of first optical beams from being collimated along the axis extending through the trapping region to respective directions convergent with respect to each other to the central axis.

6. The system of claim 5, wherein the second set of optics comprises a second lens configured to collimate the plurality of first optical beams exiting the trapping region from respective directions divergent with respect to each other to respective parallel propagation from the trapping region.

7. The system of claim 6, wherein the second optical source is arranged as a set of mirrors to provide a plurality of the second optical beams as reflected versions of the collimated first optical beams.

8. The system of claim 7, wherein the second lens is further configured to refract the collimated second optical beams to respective directions convergent with respect to each other to the central axis.

9. The system of claim 6, wherein the second lens is further configured to collimate detection light associated with the vapor of atoms in the trapping region parallel to the central axis, the detection light being collimated by the second lens to the respective parallel propagation along the central axis from the trapping region, wherein the second set of optics comprises a third lens configured to provide the detection light from the parallel propagation along the central axis to a photodetector system for determining a measurable parameter via a processor based on a characteristic associated with the detection light.

10. An optical system comprising the MOT system of claim 1, the optical system further comprising:
    a processor; and
    a photodetector system;
    wherein the second set of optics comprises a lens that is configured to refract detection light associated with the vapor of atoms in the trapping region, the detection light being collimated by the lens to the respective parallel propagation along the axis from the trapping region, wherein the second set of optics comprises another lens configured to provide the detection light to the photodetector system for determining a measurable parameter via the processor based on a characteristic associated with the detection light.

11. A method for trapping a vapor of atoms in a trapping region in a magneto optical trap (MOT) system, the method comprising:
    providing a first optical beam along a central axis associated with the MOT system via a trapping laser;
    splitting the first optical beam into a plurality of first optical beams parallel to the central axis via a first set of optics;
    providing the plurality of first optical beams to the central axis through the trapping region;
    reflecting the plurality of first optical beams via a second set of optics to provide a plurality of second optical beams parallel to the central axis associated with the MOT system; and
    providing the second optical beams to the central axis through the trapping region via the second set of optics, each of the second optical beams being coaxial with a respective one of the first optical beams, such that each of the first optical beams is counterpropagating with a respective one of the second optical beams.

12. The method of claim 11, wherein splitting the first optical beam comprises splitting the first optical beam into a set of three first optical beams, wherein providing the first optical beams through the trapping region comprises providing the three first optical beams to have respective propagation axes that are equiangular about the central axis, wherein the propagation axes of the three first optical beams converge in an approximate central point of the trapping region on the central axis.

13. The method of claim 12, wherein providing the second optical beams through the trapping region comprises providing the second optical beams through the trapping region as a set of three second optical beams that have propagation axes that are equiangular about the central axis, wherein the propagation axes of the three second optical beams converge in the approximate central point of the trapping region on the central axis.

14. The method of claim 11, wherein splitting the first optical beam comprises splitting the first optical beam into the three first optical beams collimated along the axis extending through the trapping region via a lens associated with the first set of optics, the method further comprising collimating the plurality of first optical beams exiting the trapping region from respective directions divergent with respect to each other to respective parallel propagation from the trapping region via a lens associated with the second set of optics.

15. The method of claim 14, further comprising collimating detection light associated with the vapor of atoms in the trapping region via the lens associated with the second set of optics to the respective parallel propagation along the axis from the trapping region, the method further comprising providing the collimated detection light to detection electronics via a lens for determining a measurable parameter based on a characteristic associated with the detection light.

16. An optical system comprising:
    a magneto-optical trap (MOT) system, the MOT system comprising:
        a first optical source configured to provide at least one first optical beam parallel to a central axis associated with the MOT system;
        a first set of optics configured to provide the at least one first optical beam as a plurality of first optical beams to a central axis through a trapping region comprising a vapor of atoms;
        a second optical source configured to provide at least one second optical beam parallel to the central axis associated with the MOT system; and
        a second set of optics configured to provide the at least one second optical beam as a plurality of second optical beams through the trapping region, each of the second optical beams being coaxial with a respective one of the first optical beams, such that each of the first optical beams is counterpropagating with a respective one of the second optical beams;
    a photodetector system configured to receive detection light associated with the vapor of atoms; and
    a processor configured to determine a measurable parameter based on a characteristic associated with the detection light.

17. The system of claim 16, wherein the first optical beams are arranged as a set of three first optical beams that have propagation axes that are equiangular about the central axis, wherein the propagation axes of the three first optical beams converge in an approximate central point of the trapping region on the central axis, wherein the second optical beams are arranged as a set of three second optical beams that have propagation axes that are equiangular about the central axis, wherein the propagation axes of the three second optical beams converge in the approximate central point of the trapping region on the central axis.

18. The system of claim 16, wherein the first optical source is arranged as a trapping laser configured to generate the at least one first optical beam as a single first optical beam, wherein the first set of optics is configured to split the single first optical beam into the plurality of first optical beams, wherein the second optical source is arranged as a set of mirrors to provide a plurality of the second optical beams as reflected versions of the respective plurality of the first optical beams.

19. The system of claim 16, wherein the first set of optics comprises a lens configured to refract the plurality of first optical beams from being collimated along the axis extending through the trapping region to respective directions convergent with respect to each other to the central axis, wherein the second set of optics comprises a second lens configured to collimate the plurality of first optical beams exiting the trapping region from respective directions divergent with respect to each other to respective parallel propagation from the trapping region.

20. The system of claim 19, wherein the second optical source is arranged as a set of mirrors to provide a plurality of the second optical beams as reflected versions of the respective collimated first optical beams, wherein the second lens is further configured to refract the collimated plurality of second optical beams through the trapping region to respective directions convergent with respect to each other to the central axis.

* * * * *